United States Patent [19]

Anderson et al.

[11] Patent Number: 4,744,242

[45] Date of Patent: May 17, 1988

[54] METHOD FOR MONITORING CUTTING TOOL WEAR DURING A MACHINING OPERATION

[75] Inventors: David A. Anderson, Sumner; William A. Dias, Renton, both of Wash.

[73] Assignee: The Boeing Company, Seattle, Wash.

[21] Appl. No.: 907,989

[22] Filed: Sep. 16, 1986

[51] Int. Cl.⁴ .............................................. G01B 21/30
[52] U.S. Cl. ...................................... 73/104; 340/683
[58] Field of Search ......................... 73/104; 340/683; 364/474

[56] References Cited

U.S. PATENT DOCUMENTS

| | | | |
|---|---|---|---|
| 3,548,648 | 12/1970 | Weichbrodt et al. | 73/104 |
| 3,694,637 | 9/1972 | Edwin et al. | 235/151.3 |
| 3,710,082 | 1/1973 | Sloane et al. | 235/151 |
| 3,714,822 | 2/1973 | Lutz | 73/104 |
| 3,793,627 | 2/1974 | Darrel et al. | 340/267 R |
| 3,809,870 | 5/1974 | Auble et al. | 235/151.3 |
| 3,841,149 | 10/1974 | Edwin et al. | 73/71.4 |
| 3,848,115 | 11/1974 | Sloane et al. | 235/151 |
| 4,060,716 | 11/1977 | Pekrul et al. | 364/576 |
| 4,220,995 | 9/1980 | Shoda | 364/508 |
| 4,228,514 | 10/1980 | Weiss | 364/551 |
| 4,302,813 | 11/1981 | Kurihara et al. | 364/508 |
| 4,332,161 | 6/1982 | Kakino | 73/104 |
| 4,352,293 | 10/1982 | Kurihara et al. | 73/593 |
| 4,413,507 | 11/1983 | Drew et al. | 73/104 |
| 4,429,578 | 2/1984 | Darrel et al. | 73/659 |
| 4,435,751 | 3/1984 | Hori et al. | 364/574 |
| 4,471,444 | 9/1984 | Yee et al. | 364/475 |
| 4,501,149 | 2/1985 | Konno et al. | 73/587 |
| 4,559,600 | 12/1985 | Rao | 73/104 X |

Primary Examiner—Jerry W. Myracle
Attorney, Agent, or Firm—Bruce A. Kaser

[57] ABSTRACT

The vibration of an end mill (36) is sensed by either microphones (42, 44, 46) or accelerometers (78, 80, 82). A time domain signal is produced by these sensors which is converted into a near-real time frequency spectrum. A certain frequency band in the spectrum is directly related to end mill vibration and certain frequencies in the band will change in amplitude corresponding to certain types of end mill wear. When any of the amplitudes in the band exceed a certain threshold limit the end mill is known to be dull.

6 Claims, 5 Drawing Sheets

SPINDLE ACCELEROMETER SPECTRA SHARP VS. DULL CUTTING TOOL

SPINDLE ACCELEROMETER SENSOR, A DIFFERENTAL SPECTRUM

METHOD FOR MONITORING CUTTING TOOL WEAR DURING A MACHINING OPERATION

DESCRIPTION

1. Technical Field

This invention relates to milling machines, and more particularly, to methods and devices which sense certain parameters associated with a milling machine's cutting tool, such as tool dullness or tool loading force.

2. Background Art

The ongoing trend in the design of sophisticated milling machine systems is to eliminate, as much as is reasonably possible, the amount of reliance on skilled machinists for operating the systems. In this regard, the ultimate objective is to increase machine efficiency by reducing the impact of human error on machine operation, and to reduce cost.

In the past, a machinist's duties typically included monitoring the wear condition of a machine's cutting tool. The machinist detected tool wear by means of his senses, and based on what he could feel, see or hear, he would vary machine operation. This might include stopping the machine to inspect the tool and to replace a worn tool, or varying machine feed rates and spindle speeds to compensate for use of a worn tool. All of these things would be done for the purpose of either protecting the workpiece being milled, or for protecting the milling machine and its cutting tool.

The problem inherently associated with a machinist's use of his senses is that the machinist tends to err on the conservative side when deciding a tool is worn. What this means is that cutting tools are usually replaced earlier than necessary and before the useful life of a particular tool is entirely used. Therefore, elimination of reliance on a machinist by replacing the machinist's judgment with a more accurate wear detecting system can achieve significant reductions in the costs associated with operating a milling machine by making more efficient use of tool life. Further, a system which can do this automatically is complementary to the design of fully automatic milling machines which run untended.

A number of previous attempts have been made to detect tool wear during milling. Most of such attempts have been based on methods of detecting or measuring certain indirect cutting parameters associated with milling, such as cutting horsepower, cutting torque, and/or cutting force. Typically, both horsepower and torque have been measured at the milling machine's drive motor which, during milling, is tertiary to the spindle and causes such measurements to be inaccurate. Tool cutting force has been measured by several methods including measuring feed force and torque, spindle deflection, and cutting tool deflection. To be usable, these last methods all require certain kinds of pre-existing machine structure, such as extended spindles, for example, or drastic modifications to machine structure. Further, measurements of horsepower and force require calculation or prediction of horsepower and force values which can be used as standards of comparison before actual milling operations begin. This in turn adds a further degree of inaccuracy to the above methods.

Measuring machine acoustic emission at high frequencies (above 100 kilohertz) is another method which has been used to detect tool wear. A known problem with this particular method is that it is not retrofittable to most milling machines and requires a complete modal analysis of a machine, including extensive calibration, before it can be used in connection therewith.

All of the above methods have met with limited success in actual use. They can be useful in certain kinds of roughing and semi-finishing milling operations where substantial amounts of mechanical energy and force are expended. However, low amounts of energy and force are typically expended in a finishing type of milling operation which renders these methods ineffective.

Of those prior art patents which are known to be relevant to the present invention, two of the most pertinent are U.S. Pat. No. 3,548,648 issued to Weichbrodt et al. on Dec. 22, 1970, and U.S. Pat. No. 3,694,637 issued to Edwin et al. on Sept. 26, 1972.

The Weichbrodt patent relates to machining with a single point tool. Like the present invention, Weichbrodt senses vibrations that are generated by a cutting tool. However, unlike the present invention Weichbrodt determines cutting tool wear by monitoring the ratio of the total energy in a high frequency vibrational range or band to that in a low frequency range or band. Weichbrodt is not capable of differentiating between various frequencies across either the low or high bands, and because of this, Weichbrodt cannot provide the sensitivity and accuracy provided by the present invention.

Edwin, too, senses vibrations generated by a cutting tool. However, the Edwin patent requires that a series of calibration tests or analyses first be conducted prior to use of a particular cutting tool in order to determine that tool's wear characteristics. Such tests are specific to tool type, specific machine, and the particular cut being made. Specific frequency spectra are determined from the tests and compilations of empirical wear data are made to correlate the spectra with tool wear. This is used to produce a threshold "signature" of the tool. The tool's signature is then utilized as a standard of comparison for determining tool wear during milling.

A significant difference between the Edwin patent and the present invention is that in the present invention no threshold "signature" is required to determine tool wear. As a practical matter, what this means is the present invention can be moved from one type of machine to another quite readily without requiring the development of a "signature" specific to the other machine and/or tool.

DISCLOSURE OF THE INVENTION

This invention provides a method and apparatus for measuring cutting tool wear during a milling operation. The invention is particularly adapted for use in connection with cutting tools of the type commonly known as end mills. The invention makes use of the fact that cutting tools produce unique vibration patterns when in use, with such patterns varying in measurable amounts corresponding to tool wear.

The invention includes means for sensing tool vibration. Such sensing means may be in the form of sensors which sense acoustic vibration of the tool, thus recognizing that cutting tools tend to act like tuning forks during cutting or milling. Alternatively, tool vibration may be sensed by accelerometers mounted on or near machine structure to which the cutting tool is mounted.

The sensing means produces a wave form or time domain signal which is preferably converted into individual tool vibrational frequencies by means of fast Fourier transform techniques. This is used to produce a range of frequencies in near-real time during milling, some of which indicate certain types of tool wear. These frequencies are continuously sensed or monitored during milling and, when the amplitudes of any within a certain preselected frequency band exceed a certain threshold value, the cutting tool is known to be dull.

Preferably, the above preselected frequency band ranges from approximately 2.5 to 20.0 kilohertz (KHz). Those frequencies which are below this band are generally known to be attributable to machine vibration and not cutting tool vibration. Certain individual frequencies in the high band (2.5-20.0 KHz) will indicate certain kinds of tool wear such as flank wear or tooth chipping, for example. However, if the amplitudes of any of these frequencies exceed the threshold value, then the tool is known to be dull regardless of whether the high amplitude results from flank wear, tooth chipping or any other wear condition.

An advantage to the present invention is that it has the capability of distinguishing between various kinds of cutting tool wear. For example, the invention has the capability of indicating flank wear, tooth chipping or broken corners of an end mill.

Another advantage to the present invention is that it requires no input parameters at the beginning of a cutting or milling operation such as a tool "signature." This means the invention can readily be moved from one type of milling machine to another.

In conjunction with the above advantage, still another advantage to the present invention is that it is particularly adaptable for retrofitting to pre-existing milling machines. Not only can the invention be moved from one machine to another, it can also be installed to any particular machine without making substantial modifications to that machine.

Still other advantages will become apparent after reading the following description.

BRIEF DESCRIPTION OF THE DRAWINGS

In the drawings, like reference numerals and letters refer to like parts throughout the various views, and wherein.

BEST MODE FOR CARRYING OUT THE INVENTION

Figure 1:
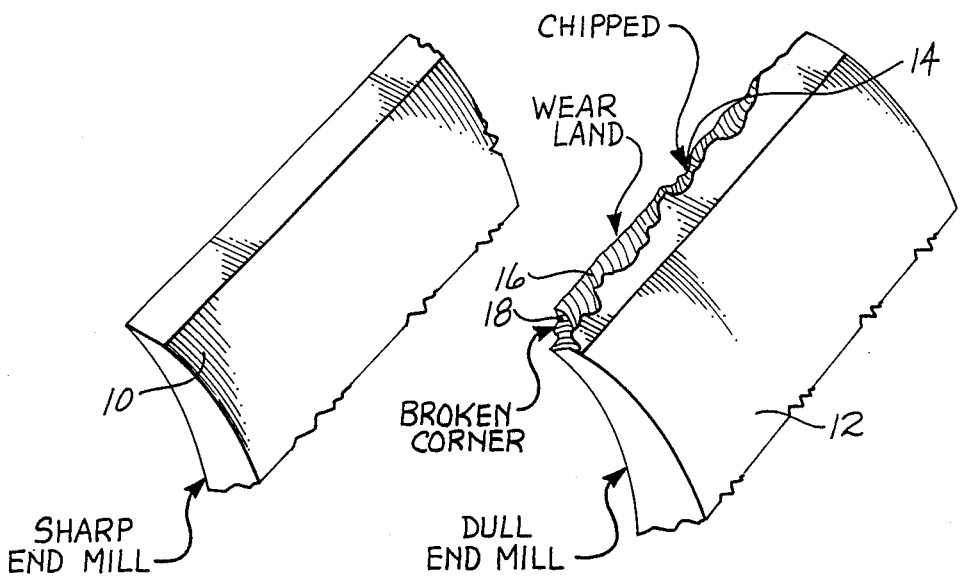
FIG. 1 is pictorial view of both a sharp and dull cutting tooth of an end mill, and shows the types of wear conditions present on an end mill's cutting tooth when the end mill becomes dull.

Referring now to the drawings, and first to FIG. 1, therein is shown a pictorial representation of both sharp and dull cutting teeth 10, 12 of an end mill. The dull tooth 12 shows the types of wear that can occur which make the tooth dull. Specifically, certain portions of the tooth may become chipped as shown at 14, or the tooth's flank may wear as shown at 16, or a corner or corners of the tooth may break as shown at 18. All of these conditions influence the amplitudes of the various frequencies of vibration associated with end mill tool wear.

Figure 2:
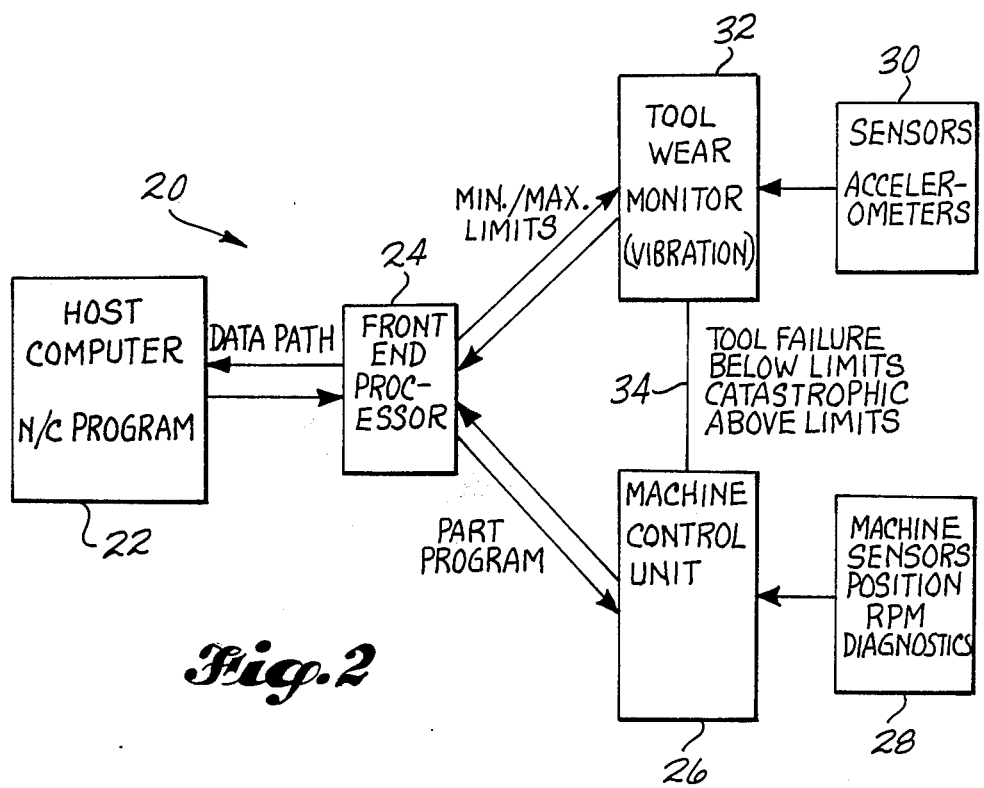
FIG. 2 is a schematic block diagram defining a typical control system for a milling machine, and shows how the present invention may be used in combination with such a system.

Referring now to FIG. 2, therein is shown at 20 a system, in block diagram, which illustrates how the present invention may be incorporated into a pre-existing milling machine control system 20. The system 20, which would be familiar to a person skilled in the art, typically includes a host or main frame computer 22 having numerical control (N/C) program capabilities. A front end processor 24 is operatively connected to the host computer 22. This processor 24 typically acts as an intermediary between the host computer 22 and a machine control unit 26, to which the processor 24 is operatively connected. The processor 24 provides the control unit 26 with commands. The control unit 26, in response to these commands, controls various machine components such as the machine's spindle motor or machine table servo motors (not shown in the drawings). Various machine sensors 28 provide position, speed and other diagnostical information to the machine control unit which is fed back to the front end processor 24. The front end processor 24, in many cases, issues further commands in response to such diagnostical information.

The present invention may be incorporated into the system 20 by providing suitable sensors 30, such as accelerometers, for example, which can sense cutting tool vibration. A tool wear monitor 32 in accordance with the invention, and operatively connected to the sensors 30, would be provided to monitor the various frequencies associated with tool vibration. The tool wear monitor 32 may be connected directly to the machine control unit 26, as shown at 34, to cause the machine control unit to stop a particular cutting operation if the cutting tool becomes dull, or the monitor 32 may continuously communicate tool wear data to the front end processor 24 which may then issue commands to the machine control unit 26 in response to tool wear data.

As was previously mentioned, cutting tool vibration may be sensed by either accelerometers or acoustic vibration sensors such as microphones. Of course, it should be understood that other types of sensors may also be suitable.

Figure 8:
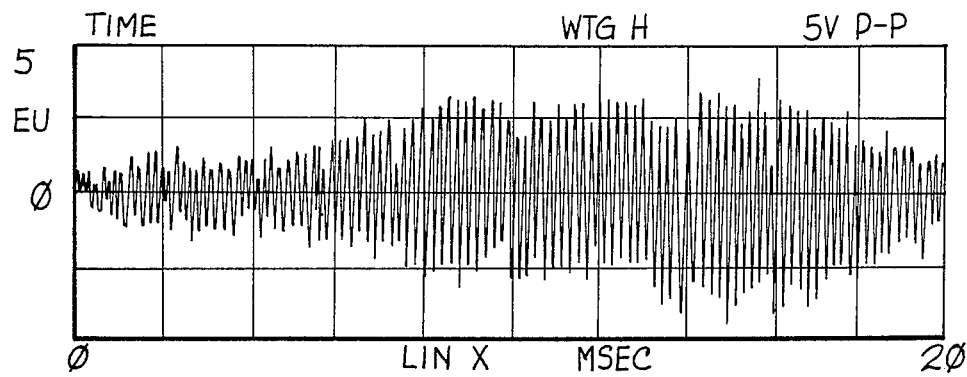
FIG. 8 is a graphical representation of a typical vibration time waveform, or time domain signal, for an end mill during cutting or milling.

Sensed vibrations are typically in the form of a time domain signal, as shown in FIG. 8, which would be familiar to a person skilled in the art. Preferably, the time domain signal is converted by means of fast Fourier transform techniques into a near-real time frequency spectrum, such as one of the two spectrums shown in FIG. 3. This is a form of digital signal processing well known in the art.

Figure 3:
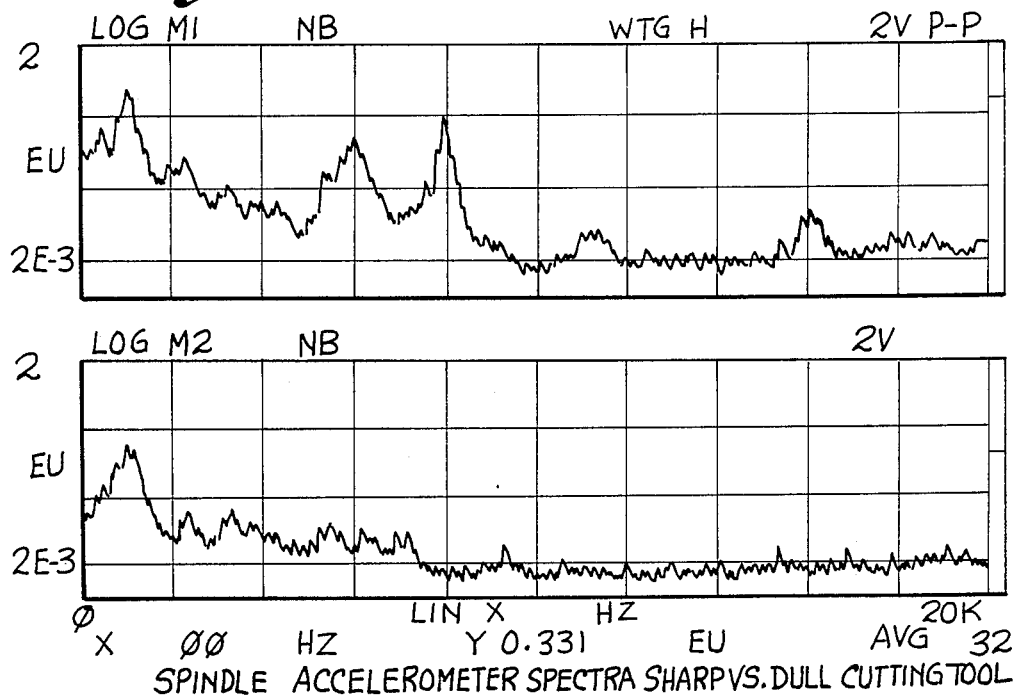
FIG. 3 is a graphical representation of frequency spectra showing typical end mill vibrations, with this Fig. showing two spectrums having a frequency range from zero to twenty kilohertz, one of which, designated as log M2, shows end mill vibration frequencies at the start of a cutting operation and the other, designated as log M1, shows the same frequency band at the end of cutting.
Figure 4:
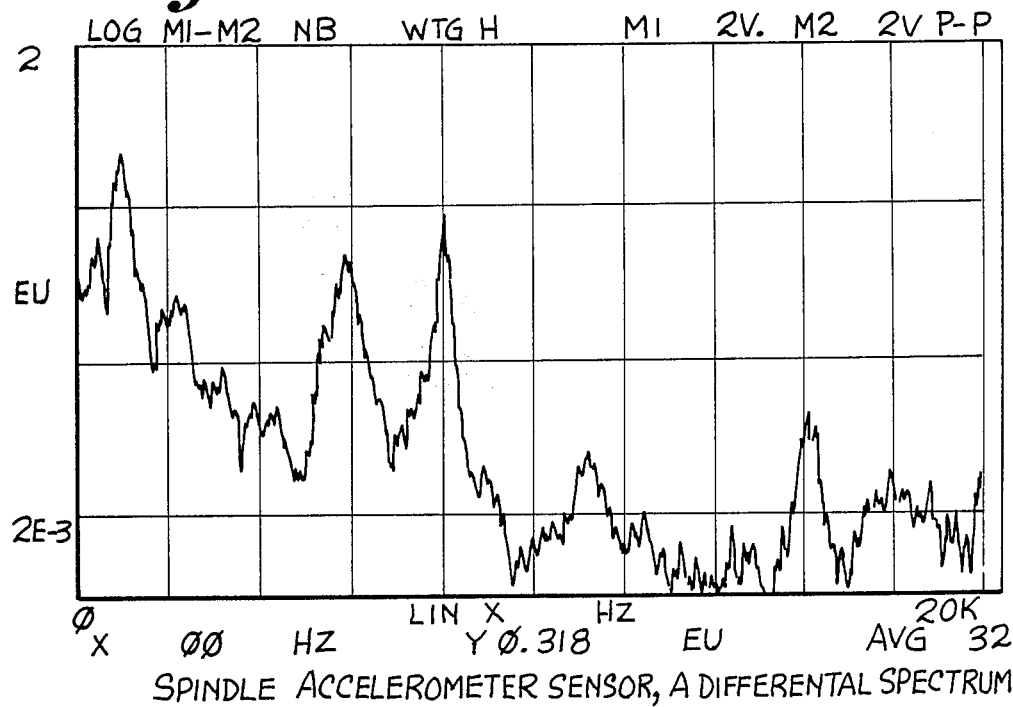
FIG. 4 is a graphical representation like FIG. 3 but shows the differential of the two spectrums in FIG. 3, i.e., log M2 subtracted from log M1.

The spectrum at the top of FIG. 3, designated as log M1, shows the various frequencies of vibration of an end mill from approximately zero to twenty kilohertz (KHz), wherein the tool is cutting and has been subjected to a certain amount of wear. The spectrum designated as log M2 shows the various frequencies over the same range but at the start of a cut. FIG. 4 is a differential spectrum of FIG. 3 (log M2 - log M1) and defines the difference in amplitudes between the sharp and dull tool spectrums. The amplitudes are measured in terms of engineering units, which would be familiar to a person skilled in the art.

It is known that in milling machines of the type which use end mills, those frequencies of vibration associated with end mill vibration are generally in the range of approximately 2.5 KHz to 20.0 KHz. More specifically, frequencies of vibration below 2.5 KHz, i.e., from approximately 0 to 2.5 KHz, generally relate to vibration associated with the milling machine itself, and not the end mill. Furthermore, within the 2.5 to 20.0 KHz range, those frequencies generally between 2.5 and 4.0 KHz are associated with resonant modes of end mill shaft vibrations. Frequencies generally between 4.0 to 20.0 KHz are associated with resonant modes of end mill flutes or teeth. Frequencies generally above this are less important in that they are associated with higher order resonant modes or overtones.

Figure 5:
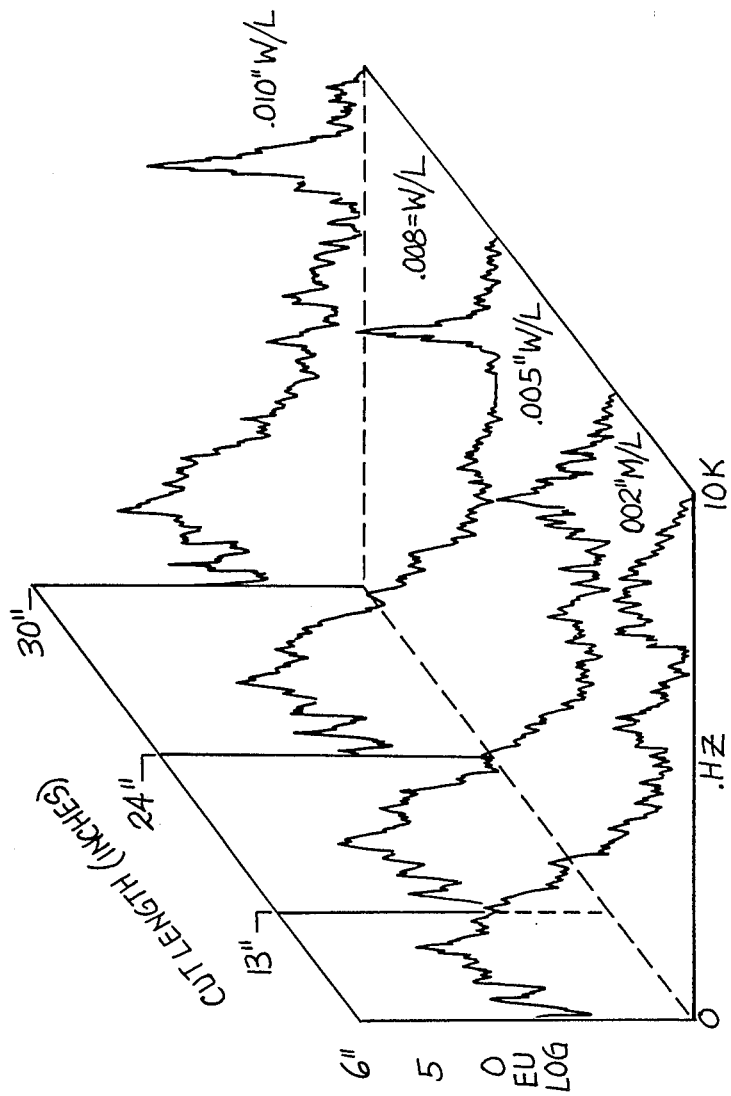
FIG. 5 is a three dimensional graphical representation based on the length of cut made by an end mill and shows the changes in amplitude of various end mill vibrational frequencies as the end mill wears.

Referring to FIG. 5, which reflects actual tests and shows for an end mill a three-dimensional graphical representation of how a near-real time spectrum as shown in FIG. 3 changes during cutting, it can be seen that the amplitudes of the frequencies in the 0 to approximately 2.5 KHz range do not change appreciably with cut length. Above this range, however, wear characteristics of the end mill become evident. For example, flank wear of the end mill can be seen to occur at approximately 8 KHz as it grows from approximately 0.002 inches after a 6 inch cut length, to approximately 0.010 inches after a 30 inch cut length. At this point, the end mill is considered to be dull. Similarly, and referring again to the top spectrum shown in FIG. 3, tooth chipping is shown to occur at approximately 6 KHz, and flank wear is shown at 8 KHz.

In preferred form, the present invention monitors the various frequencies across the range from 2.5 to 20.0 KHz by using the above-described digital processing methods and if any frequencies in this band exceed a certain threshold amplitude, then a signal is generated that indicates the tool is dull. As indicated above, if desired, the invention can also identify and differentiate between various wear conditions of a dull tooth 12 as shown in the spectrum of FIG. 3. It should be emphasized, however, that if any of the frequencies in the spectrum have amplitudes that exceed the threshold value, then the tool is known to be dull regardless of whether the high amplitude is caused by tooth chipping, flank wear or broken corners. Because of this, if it is not desired to accurately differentiate between types of tool wear, less accurate analog signal processing methods may be employed as an alternative of detecting tool wear which will be described below.

Figure 6:
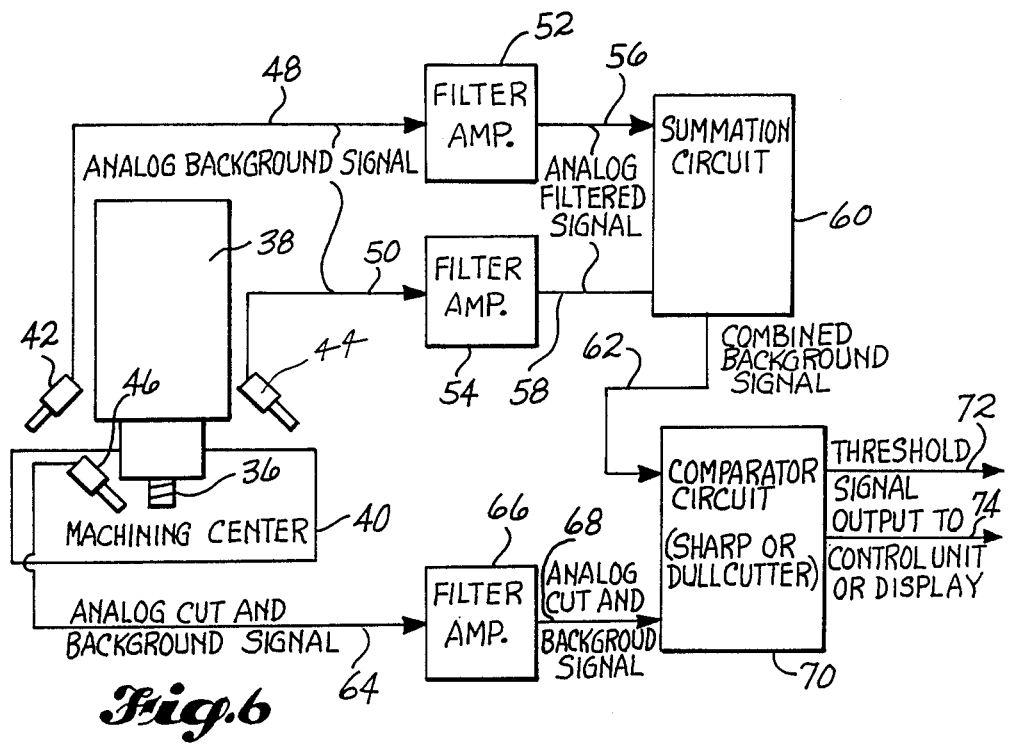
FIG. 6 is a schematic diagram of one embodiment of the invention used in connection with a milling machine, wherein the invention generates end mill vibrational frequencies from acoustic vibrations.

In the following description, two embodiments of the invention will be presented. One embodiment, shown in FIG. 6, illustrates an analog signal processing form of the invention wherein microphones are used to sense end mill acoustic vibrations and the magnitude of the signals produced thereby is used as an indicator of tool wear. A second, preferred embodiment is shown in FIG. 2. In this latter embodiment accelerometers are used to sense end mill vibration and the signals produced by the accelerometers are processed by the above-described digital signal processing technique where fast Fourier transform methods are used. It should be appreciated that microphones could be used in conjunction with digital signal processing and accelerometers could be used in conjunction with analog signal processing. However, the use of digital processing is preferred in that it produces the most accurate tool wear sensing system, and further, the use of accelerometers is preferred in that they provide a system which is physically more efficiently adaptable to a wide variety of milling machine systems.

The first embodiment shown in FIG. 6 schematically illustrates an end mill 36 mounted to a spindle housing 38 of a machining center 40. The machining center 40 would be of a type well familiar to a person skilled in the art. By way of example only, such a center 40 may be a Sundstrand (company tradename) OM-2 machining center.

Three microphones 42, 44, 46 of a conventional nature are employed to monitor acoustic vibration of the end mill 36. Two of the microphones 42, 44 point outwardly and the third 46 points in the direction of the end mill's cut. The outwardly directed microphones 42, 44 provide analog signals representing background vibration which is not produced by the end mill. These background signals are transmitted as indicated at 48 and 50, respectively, to a pair of filter and amplifier circuits 52, 54. After filtering and amplification the signals 48, 50 are then transmitted as is respectively shown at 56, 58 to a summation circuit 60. The summation circuit 60 combines the signals 56, 58 to produce a combined analog background signal which is output as shown 62.

The third microphone outputs an analog signal as shown at 64 which is indicative of end mill acoustic vibration during cutting, and includes a background signal component which is indicative of background vibration. The signal 64 is transmitted to another filter and amplifier circuit 66. After filtering and amplification, the analog cut and background signal is transmitted as shown at 68 to a comparator circuit 70. The comparator circuit 70 also receives the combined background signal 62.

To use the output of microphone 46 to predict tool wear, the background signal component thereof must be separated from the component which represents end mill vibration. The comparator circuit 70 uses the combined background signal 62 for this purpose by adjusting the analog cut and background signal 68 in accordance with the amount of the combined background signal 62. The adjusted signal is automatically compared to a certain preselected threshold limit at which the end mill 36 is known to be dull. If the adjusted signal exceeds the threshold limit, then the comparator circuit 70 automatically outputs a threshold signal 72 indicating a worn or dull tool. Alternatively, the comparator circuit 70 may output another signal as shown at 74 which would be transmitted to a front end processor like the front end processor 24 shown in FIG. 2. The front end processor 24 would then control the machining center 40 appropriately.

Figure 7:
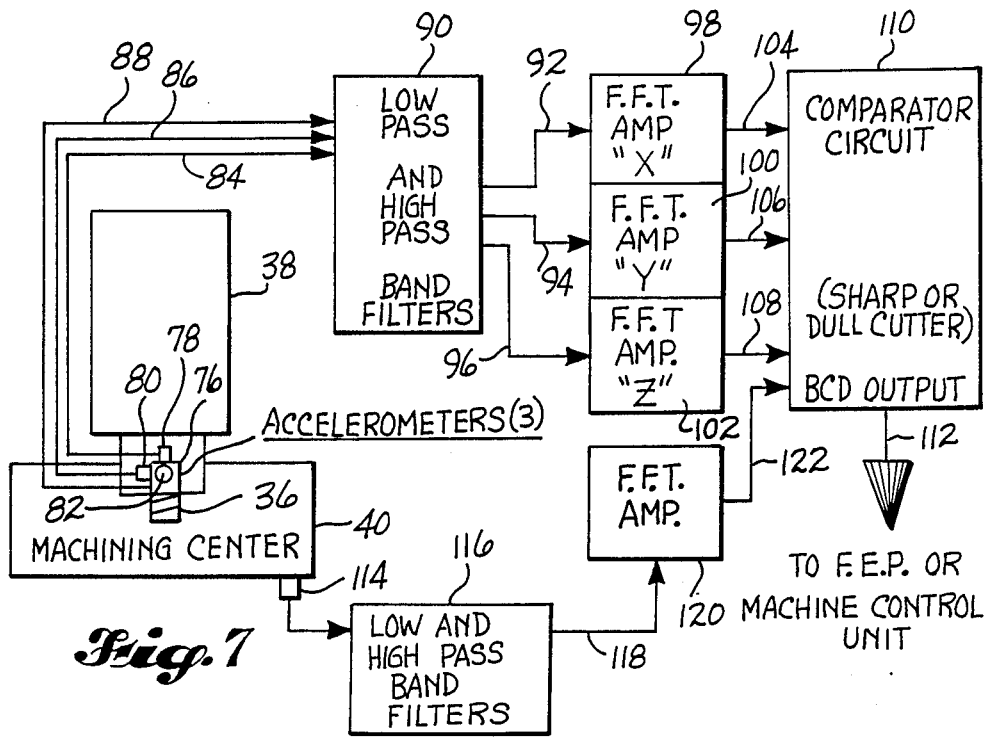
FIG. 7 is a schematic diagram of a preferred embodiment of the invention used in connection with a milling machine, wherein the invention utilizes accelerometers to monitor the actual vibration of an end mill during milling.

Directing attention now to FIG. 7, which is a preferred embodiment of the invention, therein is shown a similar machining center arrangement wherein an end mill 36 is mounted to a spindle housing 38 of a machining center 40. Suitably mounted on or near the main spindle bearing, which is schematically indicated at 76, are three accelerometers 78, 80, and 82. Each accelerometer 78, 80, 82 is mounted in a manner to detect end mill vibration along one axis of a three-axis machine coordinate system. The outputs of the accelerometers 78, 80, 82 are transmitted as shown at 84, 86, 88, respectively, to a low pass (0.0–2.5 KHz) and high pass (2.5–20.0) band filter circuit 90. The signals 84, 86, 88 are filtered in separate ranges in this manner so that the relative analog voltage amplitudes of the high band can be compared with that of the low band, if desired, which will be further described later. Preferably, these signals are output as shown at 92, 94, 96, to fast Fourier transform and amplifier circuits 98, 100, 102 for digital signal processing. Each of the latter circuits 98, 100, 102 processes a signal from each accelerometer 78, 80, 82 corresponding to vibrations in one axis of the three-axis coordinate system. Specifically, each accelerometer 78, 80, 82 produces a time domain signal much like the signal illustrated in FIG. 8. After filtering by the low pass and high pass band filter circuit 90, the fast Fourier transform circuits 98, 100, 102, transform their respective time domain signals into frequency spectra as shown in FIG. 3. FIG. 3 illustrates a frequency spectrum for the "x" axis, for example. As a person skilled in the art would know, these transformed signals are near-real in time and are output as indicated at 104, 106, 108 to a comparator circuit 110 which automatically compares the amplitudes of the frequencies produced in each axis with a preselected threshold limit. As described above, if any amplitude exceeds the threshold limit, then the comparator circuit 110 outputs a threshold signal 112 which indicates tool wear.

A fourth accelerometer 114 may be mounted to the machining center 40 for the purpose of detecting or sensing background vibration which, by way of example only, may be caused by other milling machines located in the vicinity of the machining center 40. Similar to the outputs of the accelerometers 78, 80, 82, the output of accelerometer 114 would be transmitted to another low pass and high pass band filter circuit 116. There, the accelerometer's output would be filtered and output as shown at 118 to a fast Fourier transform and amplifier circuit 120. This circuit 120 processes the signal 118 and outputs a background signal 122 to the comparator circuit 110. The comparator circuit 110 uses the background signal 122 to adjust the signals 104, 106, 108 appropriately to compensate for any components therein attributable to background vibration.

A person skilled in the art would be familiar with the various filter and amplifier circuits 52, 54, 66, the summation circuit 60, and the comparator circuit 70 shown and described in FIG. 6. Similarly, a person skilled in the art would also be familiar with the low and high pass filter circuits 90, 116, the fast Fourier transform and amplifier circuits 98, 100, 102, 120, and the comparator circuit 110 as shown and described in FIG. 7.

Referring again now to FIG. 7, the comparator circuit 110 shown therein may output a threshold signal indicating tool wear when any of the amplitudes of the frequencies in the range of approximately 2.5 KHz to at least 20.0 KHz (the high band) exceed a certain preselected limit. Alternatively, the comparator circuit 110 may be used to analyze a near-real time frequency spectrum such as the one shown in FIG. 3, which could be used to analyze specific types of tool wear (chipping, flank wear, etc.) as previously discussed. As was also previously indicated, it would not be necessary to use the fast Fourier transform circuits 98, 100, 102, 120 if a definition as to specific types of tool wear conditions is not required. For example, as would be understood by a person skilled in the art, the low pass and high pass band filter circuit 90 includes low pass and high pass band filters where each filter outputs an analog voltage amplitude. The ratio of these voltage amplitudes may be used as a general indicator of tool wear, although it would not be as accurate as the fast Fourier transform method. To be more specific, it would be possible to monitor the ratio of the voltages of the low band (0.0 KHz to 2.5 KHz) to the high band (2.5 KHz to 20.0 KHz). Any deviation of this ratio beyond a preset limit could be used to trigger the threshold output signal 112.

It is to be appreciated that the above description is provided only for exemplary purposes. A person skilled in the art would realize that various changes could be made in the embodiments described above without departing from the spirit and scope of the invention. For example, various forms of electrical circuitry could perform the electrical processing of signals as described above. The invention is not to be limited by the above description but only by the appended claims which follow, in accordance with the well-established doctrines of patent claim interpretation.

What is claimed is:

1. A method for detecting wear of a cutting tool used for machining a workpiece, comprising:
    sensing vibrational frequencies of said cutting tool during machining, wherein frequencies within a range from approximately 2.5 kilohertz (KHz) to at least 20.0 Khz are sensed;
    monitoring the amplitude of individual sensed frequencies within said range, and wherein when the amplitude of any of such frequencies exceeds a certain threshold amplitude said cutting tool is known to be dull; and
    identifying certain types of cutting tool wear by monitoring increases in amplitude of certain specific individual frequencies within said range of frequencies.

2. The method of claim 1, wherein sensing cutting tool vibrational frequencies further includes sensing mechanical vibration of said cutting tool during machining.

3. The method of claim 1, wherein sensing cutting tool vibrational frequencies further includes sensing acoustic vibration of said cutting tool during machining.

4. The method of claim 1, wherein sensing cutting tool vibrational frequencies further includes providing a voltage signal whose amplitude represents the amplitude of said frequencies within said range, and
    monitoring said amplitude of said frequencies includes monitoring the amplitude of said voltage signal.

5. A method for detecting wear of a cutting tool used for machining a workpiece, comprising:
    sensing vibrational frequencies of said cutting tool during machining, wherein frequencies within a certain preselected range of frequencies are sensed, and wherein sensing vibrational frequencies includes obtaining a time domain signal indicating cutting tool vibration, and converting said time domain signal into a frequency spectrum indicating the amplitudes of said frequencies within said preselected range by using a fast Fourier transform digital operation, and monitoring the amplitude of said frequencies during machining, wherein when the amplitude of any of such monitored frequencies exceeds a certain threshold amplitude said cutting tool is known to be dull.

6. The method of claim 5, wherein sensing said preselected frequency range includes sensing a range of frequencies from approximately 2.5 kilohertz (KHz) to at least 20.0 KHz.

* * * * *